United States Patent
Page et al.

(10) Patent No.: US 9,600,506 B2
(45) Date of Patent: *Mar. 21, 2017

(54) UNIVERSAL DELTA SET MANAGEMENT

(71) Applicant: The Boeing Company, Chicago, IL (US)

(72) Inventors: William H. Page, Larkspur, CO (US); John B. Sims, Littleton, CO (US)

(73) Assignee: THE BOEING COMPANY, Chicago, IL (US)

( * ) Notice: Subject to any disclaimer, the term of this patent is extended or adjusted under 35 U.S.C. 154(b) by 268 days.

This patent is subject to a terminal disclaimer.

(21) Appl. No.: 14/289,587

(22) Filed: May 28, 2014

(65) Prior Publication Data
US 2014/0279981 A1  Sep. 18, 2014

Related U.S. Application Data

(63) Continuation of application No. 12/548,943, filed on Aug. 27, 2009, now Pat. No. 8,756,195.

(51) Int. Cl.
  *G06F 7/00* (2006.01)
  *G06F 17/00* (2006.01)
  *G06F 17/30* (2006.01)
  *G06F 9/44* (2006.01)

(52) U.S. Cl.
  CPC .......... *G06F 17/30309* (2013.01); *G06F 8/68* (2013.01); *G06F 17/30091* (2013.01)

(58) Field of Classification Search
  CPC ................. G06F 17/30174; G06F 17/3023
  USPC ......................................... 707/638
  See application file for complete search history.

(56) References Cited

U.S. PATENT DOCUMENTS

| | | | |
|---|---|---|---|
| 5,813,017 A | 9/1998 | Morris | |
| 6,892,207 B2 | 5/2005 | McKay et al. | |
| 7,334,004 B2 | 2/2008 | Ganesh et al. | |
| 7,516,451 B2 | 4/2009 | Peng | |
| 8,756,195 B2 | 6/2014 | Page et al. | |
| 2002/0147733 A1 | 10/2002 | Gold et al. | |
| 2002/0147849 A1 | 10/2002 | Wong et al. | |
| 2002/0169740 A1* | 11/2002 | Korn | G06F 17/30162 |
| 2003/0204531 A1 | 10/2003 | Kuzmin | |
| 2004/0148303 A1 | 7/2004 | McKay et al. | |
| 2004/0152455 A1 | 8/2004 | Herle | |

(Continued)

FOREIGN PATENT DOCUMENTS

| | | |
|---|---|---|
| EP | 1426870 A2 | 6/2004 |
| WO | 9963434 A1 | 12/1999 |

OTHER PUBLICATIONS

Mahan, "Agents and Mobile Handsets", IEEE, Apr. 2001, pp. 448-451.

(Continued)

*Primary Examiner* — Van Oberly
(74) *Attorney, Agent, or Firm* — Yee & Associates, P.C.

(57) ABSTRACT

The different advantageous embodiments provide a method for identifying changes in data sets. An ending version for a data set is received. A beginning version for the data set is identified. The ending version for the data set is compared with the beginning version for the data set. A number of differences is calculated between the ending version and the beginning version. A data structure is created that identifies the number of differences between the ending version and the beginning version.

12 Claims, 10 Drawing Sheets

(56) References Cited

U.S. PATENT DOCUMENTS

2005/0080823 A1  4/2005 Collins
2006/0255916 A1  11/2006 Cox
2008/0040401 A1  2/2008 Reinsch
2009/0043774 A1* 2/2009 Sudhakar ............ G06F 21/6227
2009/0198393 A1  8/2009 Sims, III et al.

OTHER PUBLICATIONS

Burns et al., "In-place Reconstruction of Version Differences", IEEE, IBM Almaden Research Center, vol. 15, Issue 4, Jul. 2003, pp. 973-984.
EP Search Report for application EP10174202 dated Mar. 2, 2011.
Office action dated Jan. 19, 2012 regarding U.S. Appl. No. 12/548,943, 26 pages.
Final Office action dated Jun. 15, 2012 regarding U.S. Appl. No. 12/548,943, 32 pages.
Office action dated Oct. 23, 2012 regarding U.S. Appl. No. 12/548,943, 33 pages.
Final Office action dated May 20, 2013 regarding U.S. Appl. No. 12/548,943, 27 pages.
Notice of Allowance dated Dec. 18, 2013 regarding U.S. Appl. No. 12/548,943, 12 pages.
Notice of Allowance dated Apr. 17, 2014 regarding U.S. Appl. No. 12/548,943, 11 pages.

* cited by examiner

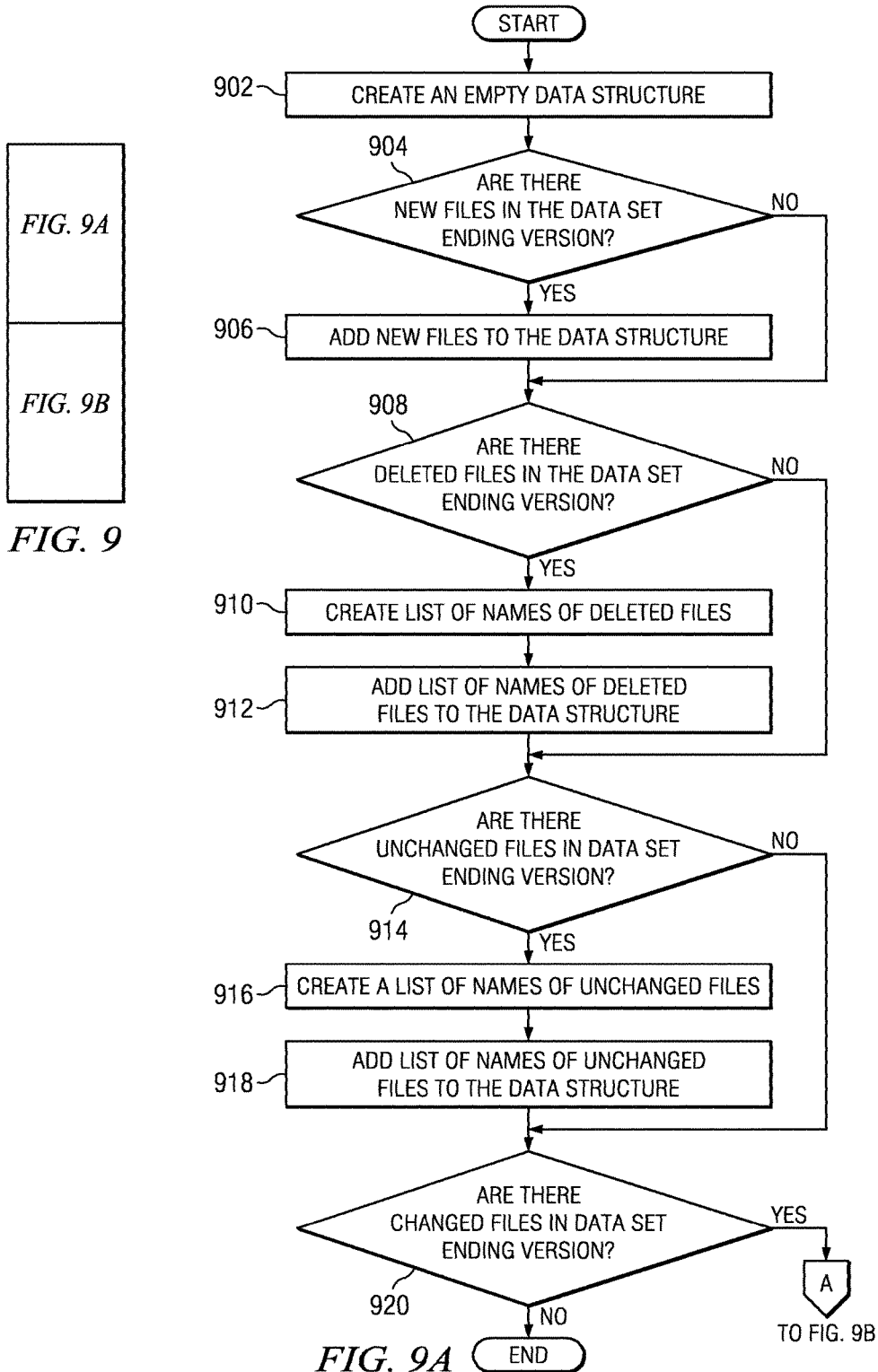

UNIVERSAL DELTA SET MANAGEMENT

CROSS REFERENCE TO RELATED APPLICATIONS

This application is a continuation of U.S. patent application Ser. No. 12/548,943, filed Aug. 27, 2009, now U.S. Pat. No. 8,756,195, the entire disclosure of which is incorporated by reference herein.

BACKGROUND INFORMATION

1. Field

The present disclosure relates generally to file management and more particularly to identifying and updating changes in data directories.

2. Background

Electronic flight bags are used by flight crews to perform flight management tasks. These electronic information management devices increase the ease and efficiency of flight management tasks. An electronic flight bag is a general purpose computing platform that reduces, or replaces, paper-based reference material used by the flight crew, including the Aircraft Operating Manual, Aircrew Operating Manual, and Navigational Charts. In addition, the electronic flight bag can host purpose-built software applications to automate other functions normally conducted by hand, such as performance take-off calculations.

Information updates are used to ensure that the data on an electronic flight bag is up-to-date. Because these data uploads are often large, the transmission process may be time-consuming. The transmission of data updates to the electronic flight bags are typically performed over wireless connections. Often, the aircraft requiring an electronic flight bag update may only be on the ground for a limited amount of time between flights. The time constraint presented by the aircraft availability on-ground, the low bandwidth available for wireless transmission, and the time-consuming process of a large data update combine to present a dilemma for efficient data updates to electronic flight bags.

Therefore, it would be advantageous to have a method and apparatus that overcomes one or more of the issues described above as well as possibly other issues.

SUMMARY

The different advantageous embodiments provide a method for identifying changes in data sets. An ending version for a data set is received. A beginning version for the data set is identified. The ending version for the data set is compared with the beginning version for the data set. A number of differences is calculated between the ending version and the beginning version. A data structure is created that identifies the number of differences between the ending version and the beginning version.

The different advantageous embodiments further provide a method for creating an update file. An empty data structure is created. A number of differences is identified between an ending version of a data set and a beginning version of the data set. A number of files is added to the empty data structure using the number of differences identified to form the update file.

The different advantageous embodiments further provide a method for identifying changes in data sets. An ending version for a data set is received. A beginning version for the data set is identified. The ending version for the data set is compared with the beginning version for the data set. A number of differences is calculated between the ending version and the beginning version. A number of constraints is identified for transmission of the number of differences. An update file is created that identifies the number of differences between the ending version and the beginning version using the number of constraints.

The different advantageous embodiments further provide a method for updating data sets. An update file is received from a source system. A beginning version of a data set is identified from a target data directory on a target system. The beginning version of the data set is compared with the update file received. A number of differences is calculated between the beginning version of the data set and the update file received. An ending version data directory is created on the target system based on the number of differences between the beginning version of the data set and the update file received.

The different advantageous embodiments further provide a system for creating an update file comprising a number of data directories, a transmission decision process, and a delta computing process. The transmission decision process is configured to calculate a data file size using a number of constraints. The delta computing process is coupled to the transmission decision process and is configured to create the update file using the data file size.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIGS. 9A-9B are an illustration of a process for creating an update file in accordance with an advantageous embodiment;

DETAILED DESCRIPTION

Figure 1:
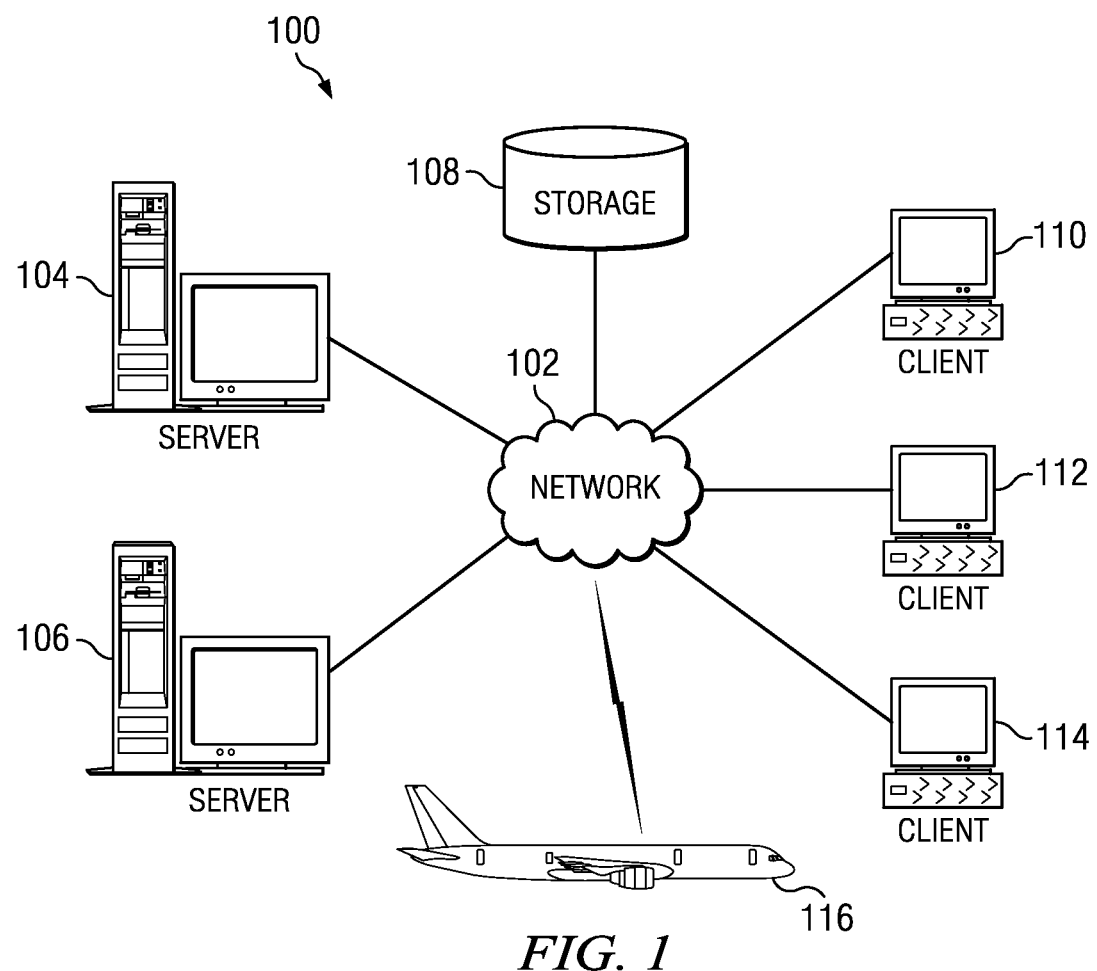
FIG. 1 is a pictorial representation of a network of data processing systems in which the advantageous embodiments of the present invention may be implemented.
Figure 2:
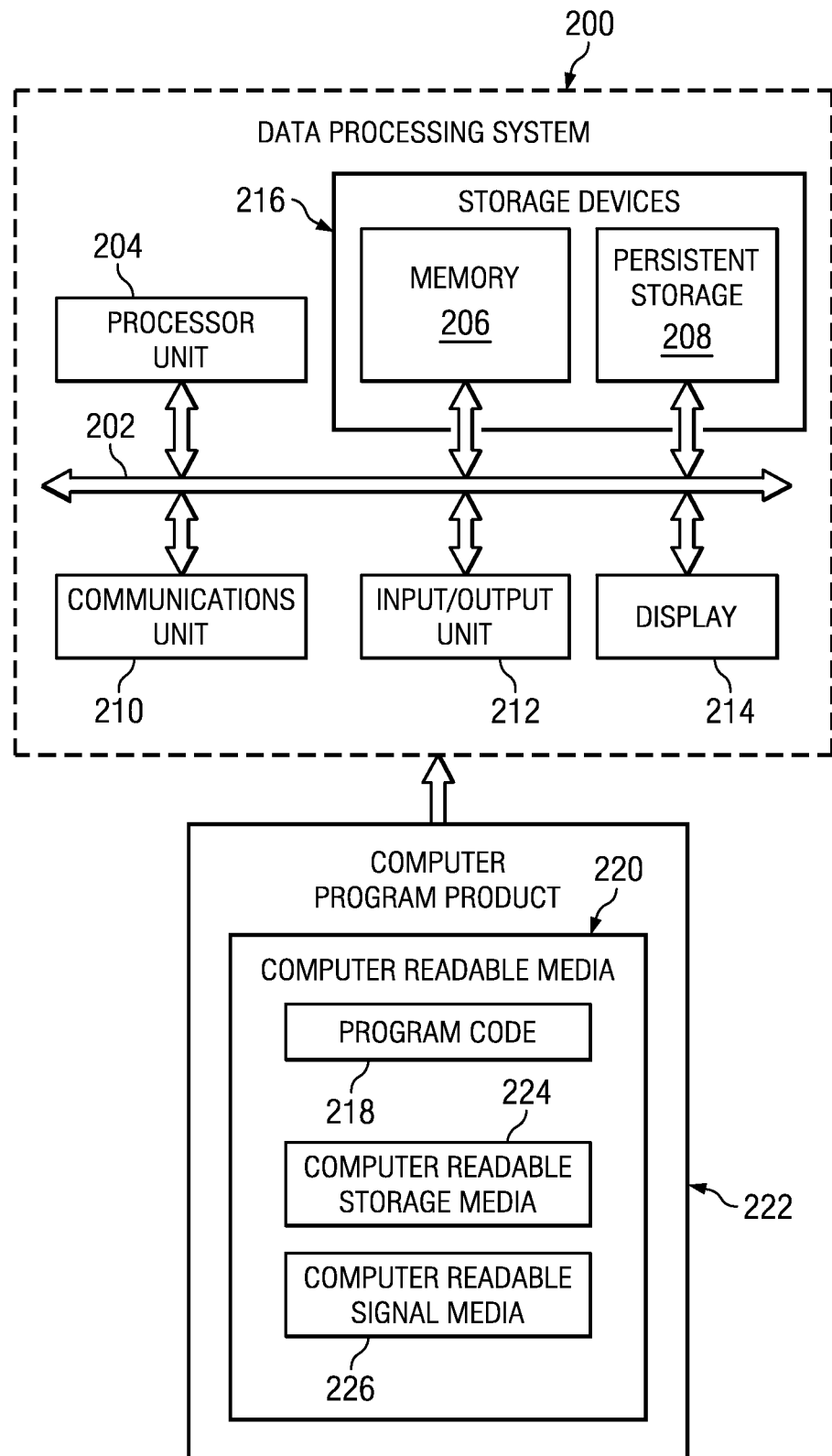
FIG. 2 is an illustration of a data processing system in accordance with an advantageous embodiment.

With reference now to the figures and in particular with reference to FIGS. 1-2, exemplary diagrams of data processing environments are provided in which the advantageous embodiments of the present invention may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which the advantageous embodiments of the present invention may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Aircraft 116 also is a client that may exchange information with clients 110, 112, and 114. Aircraft 116 also may exchange information with servers 104 and 106. Aircraft 116 may exchange data with different computers through a wireless communications link while in-flight or any other type of communications link while on the ground. In these examples, server 104, server 106, client 110, client 112, and client 114 may be computers. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

Turning now to FIG. 2, an illustration of a data processing system is depicted in accordance with an advantageous embodiment. Data processing system 200 is an example of a data processing system that may be used to implement servers and clients, such as server 104 and client 110. Further, data processing system 200 is an example of a data processing system that may be found in aircraft 116 in FIG. 1.

In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instruction are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 220 also may take the form of a persistent storage, such as a hard drive, a thumb drive, or a flash memory that is connected to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208 and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The different advantageous embodiments recognize and take into account that current systems and method for data updates deliver entire data sets to an electronic flight bag. These entire data sets may be multiple gigabytes in size, forcing delivery to be broken down into incremental sets until the entire set of data is delivered. The different advantageous embodiments also take into account and recognize that current systems and methods may attempt to provide a record-based incremental update capability, sending change instructions to an electronic flight bag in order to bring it to currency. This approach requires all intermediate sets of changes to be sequentially and successfully applied before the data can be completely updated to the most current state.

The different advantageous embodiments further recognize and take into account that the current systems require either delivery of the entire data set, which can be large and cumbersome for transmission, or require detailed knowledge of the internal data formats and the internal data structure of the target system of the update.

Thus, the different advantageous embodiments provide a method for identifying changes in data sets. An ending version for a data set is received. A beginning version for the data set is identified. The ending version for the data set is compared with the beginning version for the data set. A number of differences is calculated between the ending version and the beginning version. A data structure is created that identifies the number of differences between the ending version and the beginning version.

The different advantageous embodiments further provide a method for creating an update file. An empty data structure is created. A number of differences is identified between an ending version of a data set and a beginning version of the data set. A number of files is added to the empty data structure using the number of differences identified to form the update file.

The different advantageous embodiments further provide a method for identifying changes in data sets. An ending version for a data set is received. A beginning version for the data set is identified. The ending version for the data set is compared with the beginning version for the data set. A number of differences is calculated between the ending version and the beginning version. A number of constraints is identified for transmission of the number of differences. An update file is created that identifies the number of differences between the ending version and the beginning version using the number of constraints.

The different advantageous embodiments further provide a method for updating data sets. An update file is received from a source system. A beginning version of a data set is identified from a target data directory on a target system. The beginning version of the data set is compared with the update file received. A number of differences is calculated between the beginning version of the data set and the update file received. An ending version data directory is created on the target system based on the number of differences between the beginning version of the data set and the update file received.

The different advantageous embodiments further provide a system for creating an update file comprising a number of data directories, a transmission decision process, and a delta computing process. The transmission decision process is configured to calculate a data file size using a number of constraints. The delta computing process is coupled to the transmission decision process and is configured to create the update file using the data file size.

Figure 3:
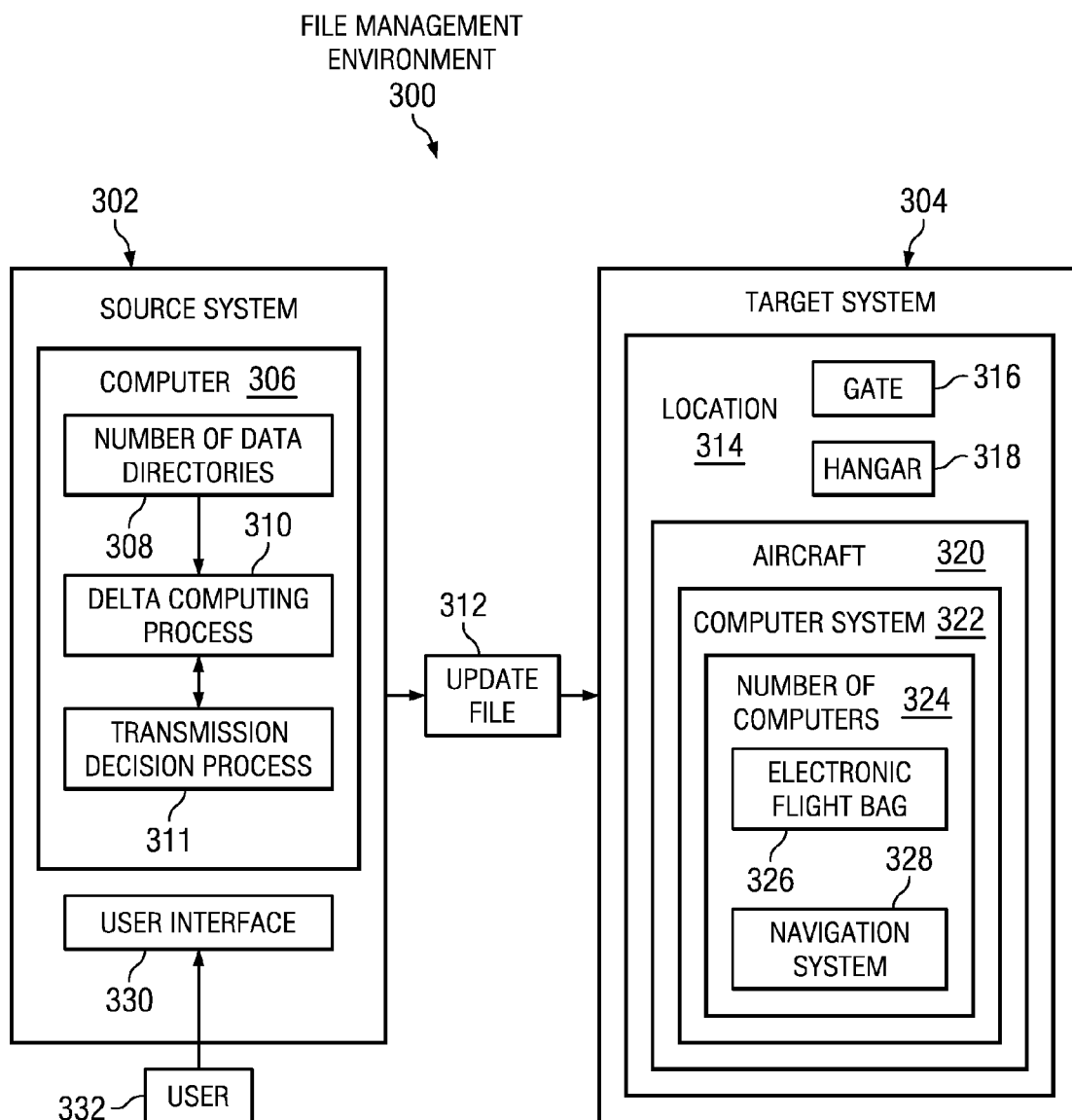
FIG. 3 is an illustration of a file management environment in accordance with an advantageous embodiment.

With reference now to FIG. 3, an illustration of a file management environment is depicted in accordance with an advantageous embodiment. File management environment 300 may be implemented in a network environment, such as network 102 in FIG. 1.

File management environment 300 includes source system 302 and target system 304. Source system 302 includes computer 306. Computer 306 may be an illustrative example of one implementation of data processing system 200 in FIG. 2. Computer 306 includes number of data directories 308, delta computing process 310, and transmission decision process 311. Delta computing process 310 and transmission decision process 311 are configured to identify and select update information from number of data directories 308 to form update file 312.

Update file 312 is transmitted by source system 302 to target system 304. Update file 312 may be transmitted using a communications unit, such as communications unit 210 in FIG. 2, which may provide communications through the use of either or both physical and wireless communications links.

Target system 304 may be located at a number of locations, such as location 314. For example, location 314 may be gate 316 and/or hangar 318. Aircraft 320 may be an illustrative example of one implementation of target system 304. Aircraft 320 includes computer system 322. Computer system 322 is comprised of number of computers 324. Electronic flight bag 326 may be an illustrative example of one of number of computers 324. Navigation system 328 may be another illustrative example of number of computers 324.

Target system 304 receives update file 312 from source system 302 and uses update file 312 to bring information location on computer system 322 up to date. In an advantageous embodiment, the updated information used to form update file 312 may be located in number of data directories 308. In another advantageous embodiment, the updated information may be received by source system 302 over user interface 330 by user 332.

The illustration of file management environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in one advantageous embodiment, delta computing process 310 may be integrated with transmission decision process 311. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

Figure 4:
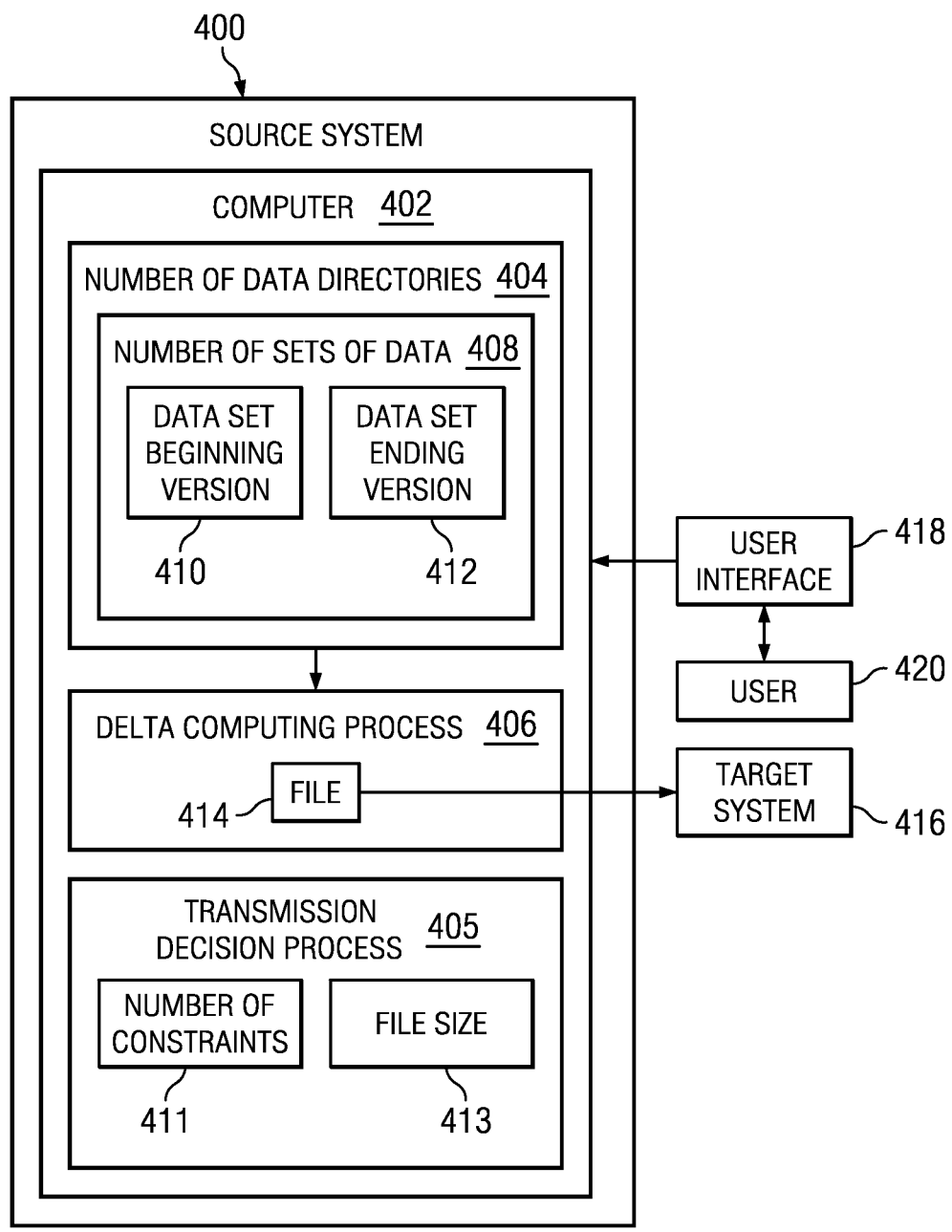
FIG. 4 is an illustration of a source system in accordance with an advantageous embodiment.

With reference now to FIG. 4, an illustration of a source system is depicted in accordance with an advantageous embodiment. Source system 400 is an illustrative example of one implementation of source system 302 in FIG. 3.

Source system 400 includes computer 402. Computer 402 contains number of data directories 404, transmission decision process 405, and delta computing process 406. Number of data directories 404 may include number of sets of data 408. Number of sets of data 408 may contain any number of different sets, or versions, of data structures, data files, and/or any other type of data. For example, data set beginning version 410 may be one set of data in number of sets of data 408. Data set ending version 412 may be an illustrative example of another set of data in number of sets of data 408. Any number of different versions between data set beginning version 410 and data set ending version 412 may be included in number of sets of data 408.

In one advantageous embodiment, delta computing process 406 may identify data set ending version 412 in number of sets of data 408 as a new version of data for data set beginning version 410. In another advantageous embodiment, user 420 may send data set ending version 412 over user interface 418 to trigger delta computing process 406.

Delta computing process 406 receives data set ending version 412 and identifies data set beginning version 410. Delta computing process 406 may then compare the two versions of data to identify a number of differences between the beginning version and the ending version. Transmission decision process 405 calculates number of constraints 411 to determine data file size 413 that fits within number of constraints 411. Delta computing process 406 creates file 414 to fit data file size 413. File 414 may be an example of one implementation of update file 312 in FIG. 3. File 414 identifies the number of differences identified by delta computing process 406. File 414 is then transmitted to target system 416.

Figure 5:
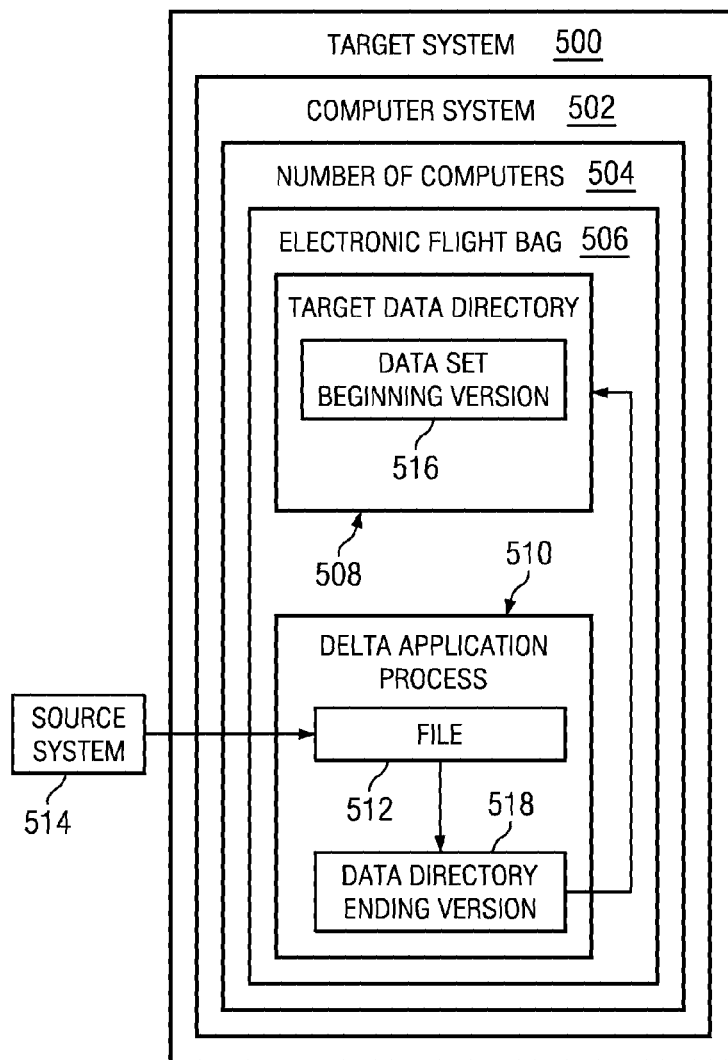
FIG. 5 is an illustration of a target system in accordance with an advantageous embodiment.

With reference now to FIG. 5, an illustration of a target system is depicted in accordance with an advantageous embodiment. Target system 500 is an illustrative example of one implementation of target system 304 in FIG. 3.

Target system 500 includes computer system 502. Computer system 502 may be implemented using number of computers 504. Electronic flight bag 506 may be an example of one implementation of number of computers 504.

Electronic flight bag 506 includes target data directory 508 and delta application process 510. Electronic flight bag 506 may receive file 512 from source system 514. File 512 may be an example of an update file, such as update file 312 in FIG. 3. Source system 514 may be an illustrative example of one implementation of source system 302 in FIG. 3 and/or source system 400 in FIG. 3.

Delta application process 510 may use file 512 to update data set beginning version 516 on target data directory 508, creating data directory ending version 518. Electronic flight bag 506 may then replace target data directory 508 with data directory ending version 518.

Figure 6:
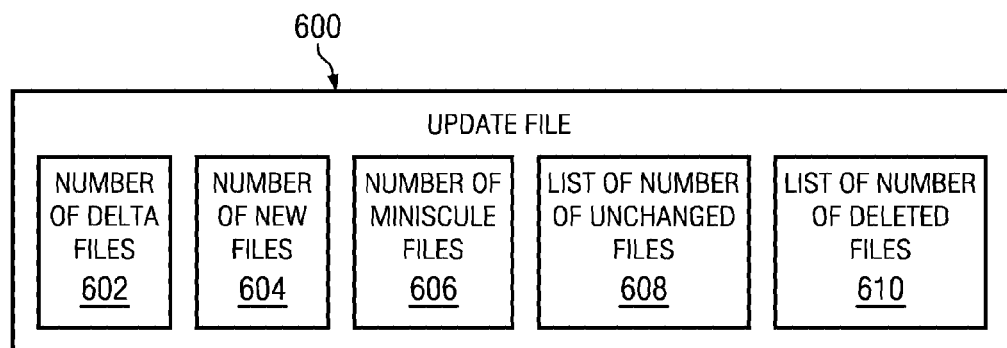
FIG. 6 is an illustration of an update file in accordance with an advantageous embodiment.

With reference now to FIG. 6, an illustration of an update file is depicted in accordance with an advantageous embodiment. Update file 600 may be an illustrative example of one implementation of update file 312 in FIG. 3.

Update file 600 may include number of delta files 602, number of new files 604, number of miniscule files 606, list of number of unchanged files 608, and/or list of number of deleted files 610. As used herein, number of refers to one or more files.

Number of delta files 602 may refer to a number of files that are mathematically computed to contain the differences between two versions of a file as well as the filename. The two versions of a file that are computed to form a delta file may be the version of a file that is present in the original state, such as a beginning version, and the version of the file in a desired end state, or ending version. As used herein, filename refers to both the relative file path as well as the file name for a particular file.

Number of new files 604 may refer to a number of files that are present in the desired end state, or ending version, but are not present in the original state of the data, or beginning version. Number of new files 604 may also include the filename for each new file in number of new files 604.

Number of miniscule files 606 may include a number of files that are present in both the original state and the desired end state, are different between the two states, but have a size that is less than a predefined threshold. If the size of a changed file is smaller than that of a predefined threshold, the changed file can be copied to update file 600 as a miniscule file rather than mathematically computed to form a delta file. Number of miniscule files 606 may also include the filename for each miniscule file in number of miniscule files 606.

List of number of unchanged files 608 refers to a list of filenames for a number of files that are present in both the original state and the desired end state, and are not different between the two states.

List of number of deleted files 610 refers to a list of filenames for a number of files that are present in the original state and not present in the desired end state.

The illustration of update file 600 in FIG. 6 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, update file 600 may be implemented without number of new files 604. In another advantageous embodiment, update file 600 may be implemented with additional file types and/or lists of files names.

Figure 7:
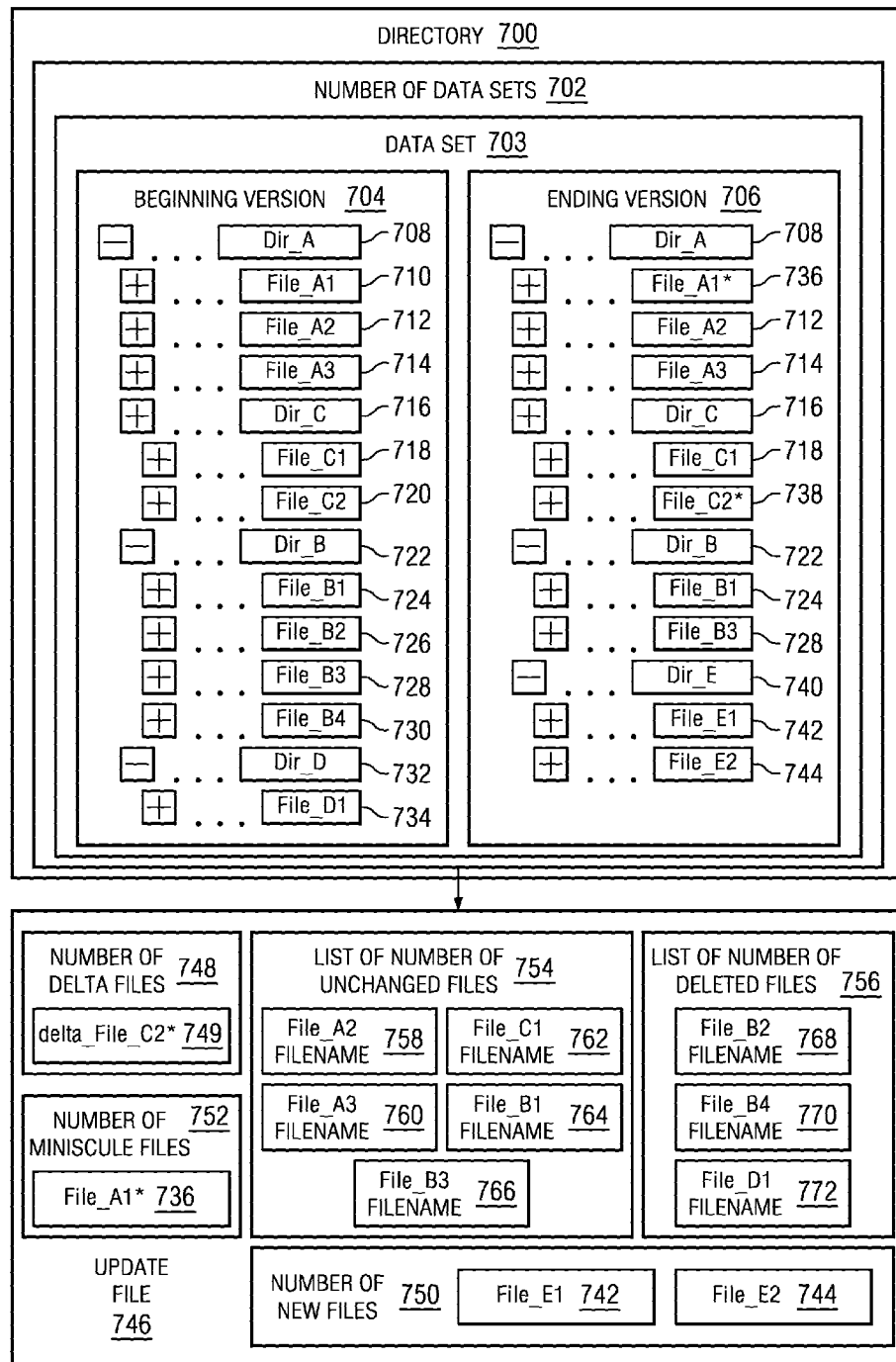
FIG. 7 is an illustration of a data directory in accordance with an advantageous embodiment.

With reference now to FIG. 7, an illustration of a data directory is depicted in accordance with an advantageous embodiment. Data directory 700 may be an example of one implementation of number of data directories 308 in FIG. 3.

Data directory 700 includes number of sets of data 702. Number of sets of data 702 includes data set 703. Data set 703 may include beginning version 704 and ending version 706. Beginning version 704 may represent the original state of data set 703, while ending version 706 may represent a desired end state for data set 703. A number of intermediate changes and/or updates to data set 703 may have occurred between the original state of beginning version 704 and the desired end state for ending version 706.

Beginning version 704 illustrates the original state of data set 703. Beginning version 704 includes directory_A 708. Directory_A 708 includes file_A1 710, file_A2 712, and file_A3 714. Beginning version 704 also includes directory_C 716, having file_C1 718 and file_C2 720. Beginning version 704 also includes directory_B 722, having file_B1 724, file_B2 726, file_B3 728, and file_B4 730. Beginning version 704 also includes directory_D 732, having file_D1 734.

Ending version 706 illustrates a desired end state of data set 703. Ending version 706 also includes directory_A 708, similar to beginning version 704. However, directory_A 708 in ending version 706 includes file_A1* 736. File_A1* 736 is a changed version of file_A1 710 from beginning version 704. File_A1* 736 may be an illustrative example of a changed file that does not reach or exceed a predefined size threshold. Directory_A 708 in ending version 706 also includes file_A2 712 and file_A3 714, which are the same, unchanged versions of file_A2 712 and file_A3 714 from beginning version 704.

Ending version 706 also includes directory_C 716, similar to beginning version 704. Directory —_C 716 includes file_C1 718, which is the same, unchanged version of file_C1 718 from beginning version 704. However, directory_C 716 in ending version 706 also includes file_C2* 738. File_C2* 738 is a changed version of file_C2 720 from beginning version 704. File_C2* 738 may be an illustrative example of a changed file that does reach or exceed a predefined size threshold.

Ending version 706 also includes directory_B 722, similar to beginning version 704. Directory_B 722 includes file_B1 724 and file_B3 728, which are the same, unchanged versions of file_B1 724 and file_B3 728 from beginning version 704. However, directory_B 722 in ending version 706 does not include file_B2 726 and file_B4 730 from beginning version 704.

Directory_D 732 having file_D1 734 in beginning version 704 is not found in ending version 706, indicating that file_D1 734 has been deleted in the desired end state of data set 703. Ending version 706 does include directory_E 740, having file_E1 742 and file_E2 744. Directory_E 740, file_E1 742, and file_E2 744 are not found in beginning version 704, indicating that directory_E 740, file_E1 742, and file_E2 744 have been added to the desired end state of data set 703.

Beginning version 704 and ending version 706 may be used by a computing process, such as delta computing process 406 in FIG. 4 for example, to create update file 746. Update file 746 may be an illustrative example of one implementation of update file 312 in FIG. 3, file 414 in FIG. 4, and/or update file 600 in FIG. 6. Update file 746 may include number of delta files 748, number of new files 750, number of miniscule files 752, list of number of unchanged files 754, and list of number of deleted files 756.

In this illustrative example, number of delta files 748 may include delta file_C2* 749. File_C2* 738 found in ending version 706 is a changed version of file_C2 720 from beginning version 704. File_C2* 738 in ending version 706 is a changed file that does reach or exceed a predefined size threshold. As such, the number of differences between file_C2 720 and file_C2* 738 is mathematically computed by the computing process to result in delta file_C2* 749. Delta file_C2* 749 includes the file path, file name, and changes to the contents of the file between file_C2 720 and file_C2* 738.

Number of new files 750 may include file_E1 742 and file_E2 744. File_E1 742 and file_E2 744 were found to be present in ending version 706 but not beginning version 704 by the computing process. As such, the computing process may determine that file_E1 742 and file_E2 744 are new files in ending version 706, and copy the new files into number of new files 750 of update file 746. File_E1 742 and file_E2 744 includes the file path, file name, and contents for each of file_E1 742 and file_E2 744 from ending version 706.

Number of miniscule files 752 may include file_A1* 736. File_A1* 736 found in ending version 706 is a changed version of file_A1 710 from beginning version 704. File_A1* 736 in ending version 706 is a changed file that does not reach or exceed a predefined size threshold. As such, file_A1* 736 is copied into number of miniscule files 752 of update file 746 by the computing process. File_A1* 736 includes the file path, file name, and contents of file_A1* 736 from ending version 706.

List of number of unchanged files 754 includes a list of file names and the corresponding file paths for each of the files that is not changed between beginning version 704 and ending version 706. In this example, list of number of unchanged files 754 includes file_A2 filename 758, file_A3 filename 760, file_C1 filename 762, file_B1 filename 764, and file_B3 filename 766. Each of the file names listed in list of number of unchanged files 754 also includes the corresponding file path for the respective unchanged file.

List of number of deleted files 756 includes a list of file names and the corresponding file paths for each of the files that is found in beginning version 704 and not found in ending version 706 by a computing process, such as delta computing process 310 in FIG. 3, for example. In this example, list of number of deleted files 756 includes file_B2 filename 768, file_B4 filename 770, and file_D1 filename 772. Each of the file names listed in list of number of deleted files 754 also includes the file path for the respective deleted file.

The illustration of data directory 700 and update file 746 in FIG. 7 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments. For example, number of sets of data 702 may contain a number of additional data sets to data set 703.

Figure 8:
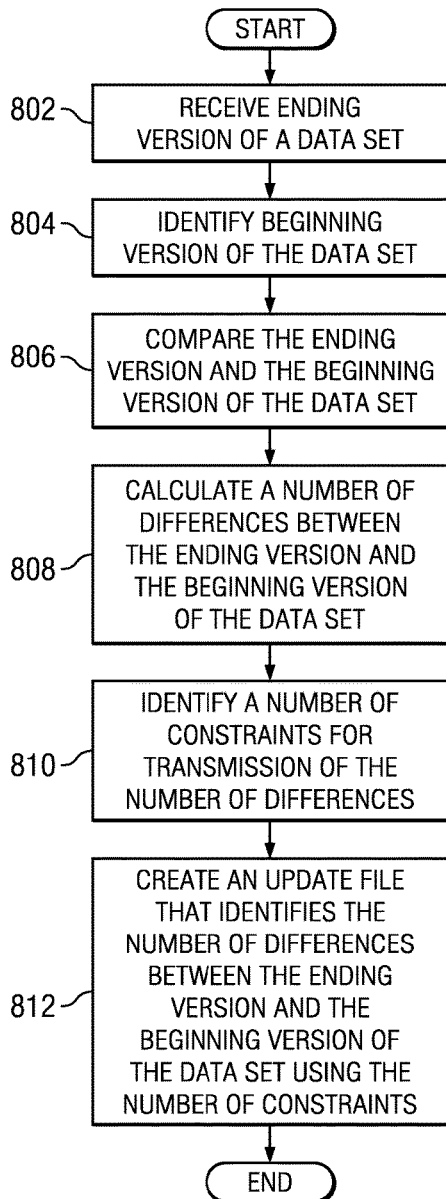
FIG. 8 is an illustration of a process for identifying changes in data sets in accordance with an advantageous embodiment.

With reference now to FIG. 8, an illustration of a process for identifying changes in data sets is depicted in accordance with an advantageous embodiment. The process in FIG. 8 may be implemented by a component such as computer 306 using delta computing process 310 and transmission decision process 311 in FIG. 3.

The process begins by receiving an ending version of a data set (operation 802) on the source system. The process identifies a beginning version of the data set (operation 804). The process compares the ending version and the beginning version of the data set (operation 806). The process then calculates a number of differences between the ending version and the beginning version of the data set (operation 808).

Next, the process identifies a number of constraints for transmission of the number of differences (operation 810). The process creates an update file that identifies the number of differences between the ending version and the beginning version of the data set using the number of constraints (operation 812), with the process terminating thereafter.

The illustration of the process in FIG. 8 is not meant to imply physical or architectural limitations to the manner in which different advantageous embodiments may be implemented. Other operations in addition to and/or in place of the ones illustrated may be used. Some operations may be unnecessary in some advantageous embodiments. Also, the operations are presented to illustrate some functional steps. One or more of these operations may be combined and/or divided into different steps when implemented in different advantageous embodiments.

Figure 9B:
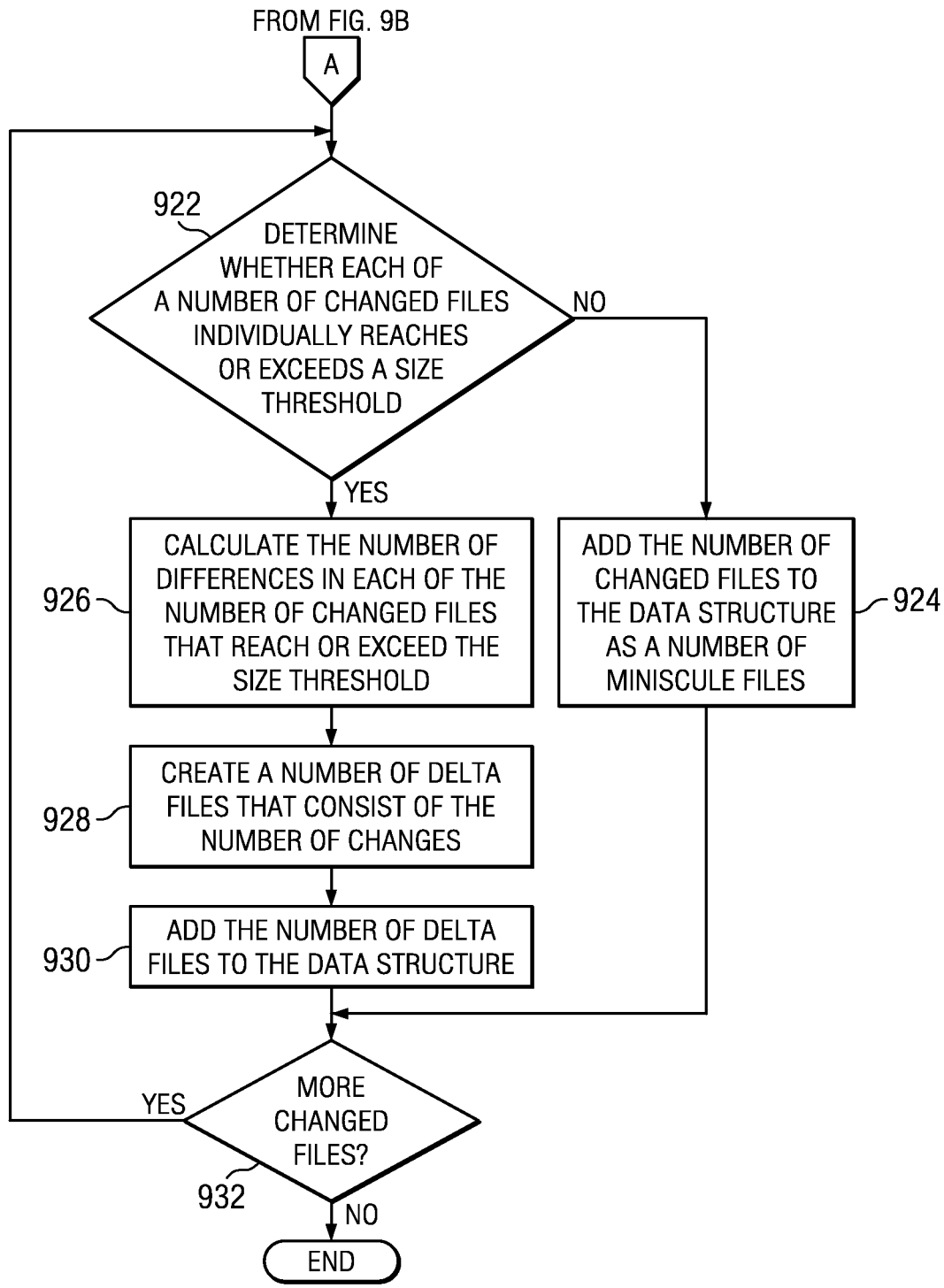

With reference now to FIGS. 9A-9B, an illustration of a process for creating an update file is depicted in accordance with an advantageous embodiment. The process in FIGS. 9A-9B may be implemented by a component such as computer 306 using delta computing process 310 and transmission decision process 311 in FIG. 3.

The process begins by creating an empty data structure (operation 902). The process determines whether there are any new files in the data set ending version (operation 904). If a determination is made that there are new files in the data set ending version, the process adds the new files to the data structure created (operation 906). If a determination is made that there are not new files in the data set ending version, the process proceeds to operation 908.

Next the process determines whether there are deleted files in the data set ending version (operation 908). If a determination is made that there are deleted files in the data set ending version, the process creates a list of names of the deleted files (operation 910) and adds the list of names of the deleted files to the data structure (operation 912). If a determination is made that there are not deleted files in the data set ending version, the process proceeds to operation 914.

The process then determines whether there are any unchanged files in the data set ending version (operation 914). If a determination is made that there are unchanged files in the data set ending version, the process creates a list of names of the unchanged files (operation 916) and adds the list of names of the unchanged files to the data structure (operation 918). If a determination is made that there are not unchanged files in the data set ending version, the process proceeds to operation 920.

The process next determines whether there are changed files in the data set ending version (operation 920). If there are no changed files, the process ends. If a determination is made that there are changed files in the data set ending version, the process next determines whether each of a number of changed files individually reaches or exceeds a size threshold (operation 922). The size threshold for each file may be, for example, file size 413 determined by transmission decision engine 405 in FIG. 4.

If a determination is made that a number of the changed files do not individually reach or exceed a size threshold, the process adds the number of changed files to the data structure as a number of miniscule files (operation 924).

If a determination is made that a number of the changed files do individually reach or exceed a size threshold, the process calculates the number of differences in each of the number of changed files that reach or exceed the size threshold (operation 926). The process then creates a number of delta files that consist of the number of changes (operation 928). Then the process adds the number of delta files to the data structure (operation 930).

The process then determines whether there are more changed files (operation 932). If a determination is made that there are more changed files, the process returns to operation 922. If a determination is made that there are no more changed files, the process terminates thereafter.

The illustration of the process in FIGS. 9A-9B is not meant to imply physical or architectural limitations to the manner in which different advantageous embodiments may be implemented. Other operations in addition to and/or in place of the ones illustrated may be used. Some operations may be unnecessary in some advantageous embodiments. Also, the operations are presented to illustrate some functional steps. One or more of these operations may be combined and/or divided into different steps when implemented in different advantageous embodiments.

Figure 10:
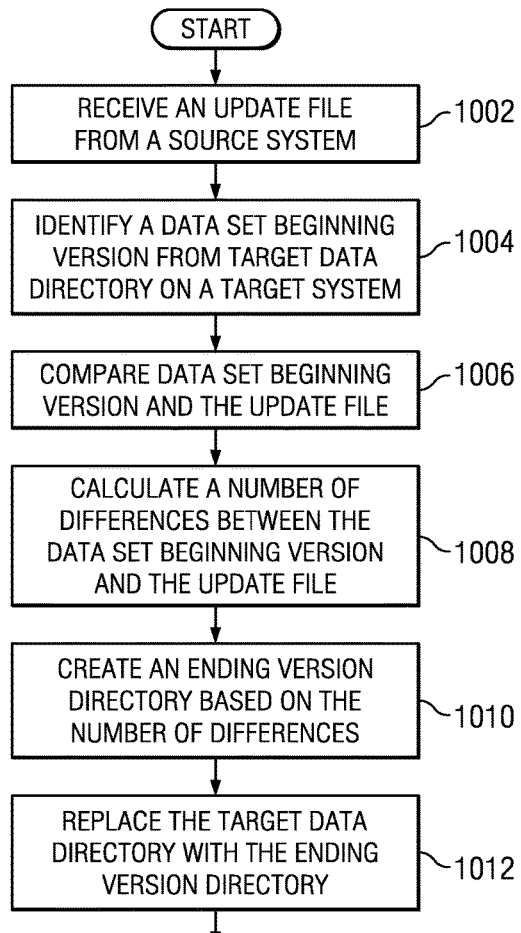
FIG. 10 is an illustration of a process for updating data sets in accordance with an advantageous embodiment.

With reference now to FIG. 10, an illustration of a process for updating data sets is depicted in accordance with an advantageous embodiment. The process in FIG. 10 may be implemented by a component such as electronic flight bag 326 in FIG. 3, for example.

The process begins by receiving an update file from a source system (operation 1002). The process identifies a data set beginning version from a target data directory on a target system (operation 1004). The process then compares the data set beginning version and the update file (operation 1006).

Next, the process calculates the number of differences between the data set beginning version and the update file (operation 1008). The process creates an ending version data directory based on the number of differences (operation 1010). The process then replaces the target data directory with the ending version directory (operation 1012), with the process terminating thereafter.

The illustration of the process in FIG. 10 is not meant to imply physical or architectural limitations to the manner in which different advantageous embodiments may be implemented. Other operations in addition to and/or in place of the ones illustrated may be used. Some operations may be unnecessary in some advantageous embodiments. Also, the operations are presented to illustrate some functional steps. One or more of these operations may be combined and/or divided into different steps when implemented in different advantageous embodiments. For example, in one advantageous embodiment a new ending directory may be written directly without replacement of the existing ending version directory.

Figure 11:
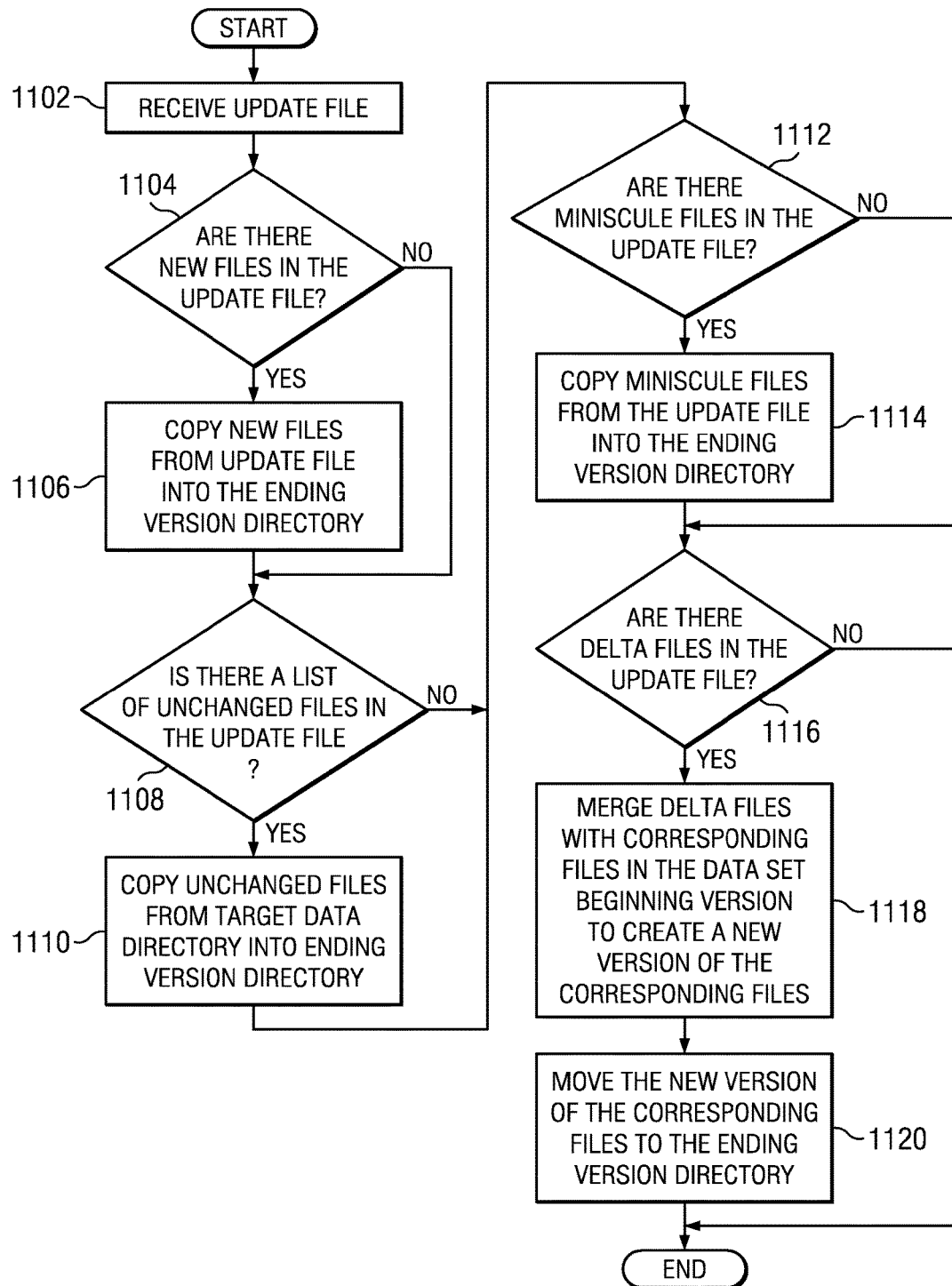
FIG. 11 is an illustration of a process for updating data sets in accordance with an advantageous embodiment.

With reference now to FIG. 11, an illustration of a process for updating data sets is depicted in accordance with an advantageous embodiment. The process in FIG. 11 may be implemented by a component such as electronic flight bag 326 in FIG. 3, for example.

The process begins by receiving an update file (operation 1102). The process determines whether there are new files in the update file (operation 1104). If a determination is made that there are new files in the update file, the process copies the new files into an ending version directory (operation 1106). If a determination is made that there are no new files, the process proceeds to operation 1108.

Next, the process determines whether there is a list of unchanged files in the update file (operation 1108). If a determination is made that there is a list of unchanged files in the update file, the process copies the unchanged files from a target directory into the ending version directory (operation 1110). If a determination is made that there is not a list of unchanged files, the process proceeds to operation 1112.

Next, the process determines whether there are miniscule files in the update file (operation 1112). If a determination is made that there are miniscule files in the update file, the process copies the miniscule files from the update file into the ending version directory (operation 1114). If a determination is made that there are no miniscule files, the process proceeds to operation 1116.

The process then determines whether there are delta files in the update file (operation 1116). If a determination is made that there are delta files in the update file, the process merges the delta files with corresponding files in the data set beginning version to create a new version of the corresponding files (operation 1118). The process then moves the new version of the corresponding files to the ending version directory (operation 1120), with the process terminating thereafter. If a determination is made that there are no changed files, the process terminates.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:
1. A method for identifying changes in data sets, the method comprising:
receiving, by a processor, an ending version for a data set, the ending version sent by a source system connected to the processor by a wireless transmission system;

identifying, by the processor, a beginning version for the data set;

comparing, by the processor, the ending version for the data set with the beginning version for the data set;

calculating, by the processor, a number of differences between the ending version and the beginning version;

creating, by the processor, a data structure in a computer-readable storage that identifies the number of differences between the ending version and the beginning version;

adding, by the processor, a number of files to the data structure using the number of differences identified to form an update file, wherein the update file comprises a number of delta files, a number of new files, and a list of a number of unchanged files, wherein responsive to identifying a number of differences between an ending version of a data set and a beginning version of the data set, determining whether there are new files in the ending version, wherein the new files are a number of files identified only in the ending version;

determining, by the processor, whether there are changed files in the ending version, wherein the changed files are a number of pairs of files, wherein the number of pairs of files are distributed so that a first file in a file pair is in the ending version of the data set and a second file in the file pair is in the beginning version of the data set, and wherein the first file and the second file have a number of differences; and responsive to a determination that there are new files in the ending version, adding the new files to the update file.

2. The method of claim 1, wherein the update file further comprises a list of a number of deleted files.

3. The method of claim 1, wherein creating the data structure further comprises:
minimizing an amount of data in the data structure.

4. The method of claim 1, further comprising:
responsive to a determination that the changed files reach or exceed the size threshold, calculating the number of differences in each of the number of pairs of files;
creating a number of delta files that consist of the number of differences in the each of the number of pairs of files; and
adding the number of delta files to the update file.

5. A method for identifying changes in data sets, the method comprising:
receiving in a processor an ending version for a data set for the target system, the processor connected to the target system by a wireless transmission system;
identifying, by the processor, a beginning version for the data set from a target data directory on a computer readable storage medium of a source system;
comparing, by the processor, the ending version for the data set with the beginning version for the data set;
calculating, by the processor, a number of differences between the ending version and the beginning version;
identifying, by the processor, a number of constraints for transmission of the number of differences;
creating, by the processor, an update file that identifies the number of differences between the ending version and the beginning version using the number of constraints, and wherein the update file comprises a number of delta files, a number of new files, and a number of changed files;
adding, by the processor, a number of files to a data structure using the number of differences identified to form the update file, the update file comprising a number of delta files, a number of new files, and a list of a number of unchanged files, wherein adding the number of files to the empty data structure further comprises:
determining, by the processor, whether there are changed files in the ending version, wherein the changed files are a number of pairs of files, wherein the number of pairs of files are distributed so that a first file in a file pair is in the ending version of the data set and a second file in the file pair is in the beginning version of the data set, and wherein the first file and the second file have a number of differences;
responsive to a determination that there are changed files in the ending version of the data set, determining, by the processor, whether the changed files reach or exceed a size threshold;
responsive to a determination that the changed files do not reach or exceed the size threshold, adding, by the processor, the changed files to the update file;
sending the update file to the target system via the wireless transmission system; and
loading the update file in the target system.

6. The method of claim 5, wherein creating the update file further comprises:
minimizing an amount of data in the update file to overcome the number of constraints for transmission.

7. The method of claim 5, wherein the number of constraints for transmission includes at least one of time, bandwidth, transmission speed, and transmission size.

8. A method of updating data sets by a source system, the method comprising:
receiving, by a processor of the source system, an ending version for a data set in a target system;
identifying, by the processor, a beginning version of a data set from a target data directory on a computer readable storage medium of the source system;
comparing, by the processor, the beginning version of the data set with the ending version for the data set received;
calculating, by the processor, a number of differences between the beginning version of the data set and the ending version for the data set; and
creating, by the processor, an ending version data directory on the target system based on the number of differences between the beginning version of the data set and the ending version for the data set;
adding, by the processor, a number of files to an empty data structure using the number of differences between the beginning version of the data set and the ending version for the data set, so as to create an update file, the update file comprising a number of delta files, a number of new files, and a list of a number of unchanged files, wherein adding the number of files to the empty data structure further comprises:
determining, by the processor, whether there are changed files in the ending version, wherein the changed files are a number of pairs of files, wherein the number of pairs of files are distributed so that a first file in a file pair is in the ending version of the data set and a second file in the file pair is in the beginning version of the data set, and wherein the first file and the second file have a number of differences;
responsive to a determination that there are changed files in the update version of the data set, determining, by the processor, whether the changed files reach or exceed a size threshold;

responsive to a determination that the changed files do not reach or exceed the size threshold, adding, by the processor, the changed files to the update file;

responsive to a determination that there are new files in the ending version, adding the new files to the update file;

responsive to adding the changed files to the update file, sending the update file to the target system via a wireless transmission system;

loading the update file in the target system; and replacing in the target system the target data directory with the ending version directory.

9. The method of claim 8, wherein creating the ending version data directory further comprises:

determining whether there are new files in the update file, wherein the new files are files that are present only in the update file;

responsive to a determination that there are new files in the update file, copying the new files into the ending version data directory.

10. The method of claim 8, wherein creating the ending version data directory further comprises:

determining whether there is a list of a number of unchanged files in the update file, wherein the list of the number of unchanged files comprises a number of file names, and wherein the number of file names represent each of the unchanged files between the beginning version of the data set and an ending version of the data set used to create the update file; and responsive to a determination that there is the list of the number of unchanged files in the update file, copying the number of files identified in the list of the number of unchanged files from the target data directory into the ending version data directory.

11. The method of claim 8, wherein creating the ending version data directory further comprises:

determining whether there are changed files in the update file; and responsive to a determination that there are changed files in the update file, copying the changed files from the update file into the ending version data directory.

12. The method of claim 8, wherein creating the ending version directory further comprises:

determining whether there are delta files in the update file;

responsive to a determination that there are delta files in the update file, merging the delta files with corresponding files in the beginning version of the data set to create an ending version of the corresponding files; and moving the ending version of the corresponding files into the ending version data directory.

* * * * *